Reissued June 28, 1932 Re. 18,506

UNITED STATES PATENT OFFICE

AMBROSE J. MANDEL, DECEASED, LATE OF FOREST HILLS, LONG ISLAND, NEW YORK, BY EDWARD MANDEL, OF FOREST HILLS, LONG ISLAND, NEW YORK, ADMINISTRATOR

METHOD OF MAKING POROUS OBJECTS

No Drawing. Original No. 1,742,515, dated January 7, 1930, Serial No. 742,481, filed October 8, 1924, renewed April 9, 1929. Application for reissue filed September 29, 1931. Serial No. 565,925.

This invention relates to a method of making porous products. Such porous products are useful for various purposes such as for filtering materials and as heat insulating materials. Provision of a satisfactory porous heat-insulating product from ordinary materials such as clay, silica, magnesia, fire clay, chromite, bauxite, silicon carbide, cement, carborundum, alundum and other similar materials, presents a peculiar problem which may be satisfactorily solved by the principle of this invention. The invention has particular value in connection with the manufacture of porous heat insulating bricks and linings for furnaces, and the description of a particular embodiment of the invention will be with reference to such heat insulating products.

It is well known that the heat or thermal conductivity of the material depends not only upon its chemical composition, but upon its physical condition or structure such as its porosity. That is, considering material of a given chemical composition, the denser the mass, the greater will be the thermal conductivity, and vice versa. If such a composition is to have a lower thermal conductivity than ordinarily, it must be produced by a change in its physical condition such as by lowering its density. Heat insulating bricks have heretofore been commonly produced from a material occurring naturally and known as infusorial or diatomaceous earth which, in chemical composition, is fairly pure silicon dioxide and is made up largely of microscopic cells so that when it is formed into various shapes, it has a relatively high degree of porosity, and thus a low thermal conductivity. A brick made from this material is soft and crumbles easily, and therefore has low mechanical strength, so that it is unsuitable alone for forming the walls of a furnace where it is necessary to support any considerable weight. The porosity is not under control and when such bricks are heated to a high temperature, they shrink and crack, which partially destroys the heat insulating value of such material.

Attempts also have been made to render ordinary brick porous, by mixing therein sawdust at the time of manufacture, and this sawdust is burned out to a greater or less extent when the bricks are burned, but since it is not volatile and must be removed by oxidation of its carbon by air which penetrates the brick, it is seldom or never completely removed from a section of any material thickness, with the result that nearly always a carbonaceous residue remains in the brick. The sawdust is fibrous in structure, is not usually finely divided, and the particles thereof are not of uniform size or substantially equal dimensions. As a result, it is impossible to obtain uniform porosity of a brick or object made with sawdust.

An object of this invention is to provide an improved porous product which may be given any degree of uniformity or variation in porosity with a maximum of strength, and which may be manufactured of any selected material which may be molded or otherwise formed into suitable shapes and then hardened. A further object is to provide an improved method of manufacturing such porous products, with which absolute uniformity of porosity may be obtained, if desired, and which is simple, economical, practical, and relatively inexpensive. A further object is to provide an improved method of manufacturing porous refractory products without changing their chemical composition or altering their refractory qualities and with which the porosity and therefore the thermal conductivity and density of the product may be varied with certainty as desired. Various other objects and advantages will be apparent from the following description of one manner of practicing the invention, and the novel features will be particularly pointed out hereinafter in claims.

In order to illustrate the principle of the invention, the practice of the invention will be described in connection with the manufacture of refractory brick and similar products, it being understood that this is for illustrative purposes only, and is not to be considered as a limitation of the invention.

In accordance with the invention, the bricks may be made of any suitable material such as the usual clays, fire clays, chromite, magnesia, bauxite, silica, cement, etc., and such material is first reduced to a finely divided or ground condition. This material is then mixed with a finely ground solid material that is easily melted or may be easily made completely volatile, which is almost or entirely insoluble in the water or other liquid which is used to make the mixture plastic for molding purposes. The amount of volatile material which is added is determined by the degree of porosity which is desired in the finished product. The whole mass is then thoroughly mixed, and sufficient liquid, such as water, added to obtain the desired plasticity. When thoroughly mixed, and moistened, the material is formed or molded into the desired shapes by any suitable, ordinary or well known methods, such as by pressing it into molds.

The articles are then allowed to dry at room temperature or at a slightly elevated temperature, but not with sufficient rapidity to cause excessive local shrinkage with a consequent production of cracks. After the drying, the articles may be placed in an oven, kiln, or other suitable apparatus and warmed to a sufficiently high temperature to melt or to volatilize and drive off completely the added volatile material. This is done preferably by sublimation, under a reduced pressure if necessary, and at a temperature which is below the melting point of the volatile solid, but high enough to volatilize it rapidly. This solid, in passing off as a vapor, is accompanied by a greater or lesser flow of liquid according to conditions and will render the mass porous by reason of its removal from the space occupied by it in the mass. The residual mass is then in a porous condition and is ready to be treated in the usual manner for hardening. To harden these products, the temperature may be raised sufficiently to completely burn or harden the same, after which they are allowed to cool and are removed from the kiln or oven, at which time they are ready for use.

By the use of suitably constructed ovens or kilns in connection with suitable condensing apparatus, the vaporized material may be condensed, recovered, reground, or redivided, and used again in the treatment of further basic material, thus decreasing materially the cost of the operation of the process. If the recovery of the volatilized material in this manner is to be followed, the volatile material which is used must be one which will not be so changed in composition or properties by the volatilizing process as to impair its usefulness for the purpose. If such material used is combustible, the temperature at which it volatilizes must be below that at which it will ignite and burn, if it is to be recovered and reused. The vaporizable material should also be almost or entirely insoluble in water or the liquid used for making the mass plastic, because if not so insoluble, the porosity of the products will not be as great, even for very large additions, and the finished article or product will not be of uniform porosity throughout its mass.

The volatile material should preferably be one which can be easily and completely volatilized and driven off as vapor at a temperature below its melting point, for in the preferred process if much of the volatile material is allowed to become liquid before the mass has been completely hardened, it will have a tendency to destroy the continuity of the structure, cause cracking, and will greatly weaken the finished product, thereby greatly impairing its usefulness unless care is used in the melting.

Any suitable vaporizable material which will answer these requirements may be used, and as examples of such materials reference may be made to such organic substances as naphthalene and anthracene, or among the inorganic materials, mercurous chloride may be used, although the latter is not entirely satisfactory. The mercurous chloride is readily vaporizable without melting and insoluble in water, but its vapors are very dangerous, and it has a strong tendency to decompose into metallic mercury and chlorine under the action of heat. Ammonium chloride may also be used since it is readily vaporizable without melting, but since it is soluble in water it affects the plastic quality of the mixture and produces an irregular degree of porosity, and therefore is not as satisfactory as naphthalene or anthracene.

Naphthalene and anthracene are the preferable vaporizable solids for most purposes since they are insoluble in water, can be completely volatilized at temperatures below their melting points, and may be divided into fine particles of approximately uniform size and roughly spherical shape, thus giving uniform porosity to the articles made by this improved process. While naphthalene and anthracene are originally more expensive than sawdust, they can be recovered inexpensively with only a trifling loss, so that the net cost of their use is not prohibitive but very advantageous.

Porous bricks should not be used in direct contact with slags, since their porous nature makes them absorbent to slags, and therefore if the surfaces of such brick are likely to come in contact with slag, they must be protected with a non-porous surface. Heretofore the most common method of protecting the exposed surface of a porous brick has been to coat it with a layer of refractory cement, which after hardening, leaves a non-porous refractory surface layer. Usually, the brick has been burned before this layer is applied, so that this layer is not an integral part of the brick. Since this surface layer must, of necessity, be of such chemical composition that it does not react with the brick or it will cause melting at the contact surface, it never becomes an integral part thereof, and hence after repeated heatings it eventually falls off and leaves the porous surface of the brick exposed.

With these improved processes, it is possible to produce an integral brick or object with integral non-porous and porous sections. For example, an object may be made with a non-porous surface layer, backed with a body of any desired degree of porosity, merely by first placing in the mold or form a layer of any desired thickness of the plastic material which contains no added vaporizable material, and then completely filling the mold or form with a quantity of the plastic material in which any desired percentage of the vaporizable substance has been mixed. This brick is then treated as before explained in order to make it porous and after being burned or treated to drive off the vaporizable material, the surface layer will be non-porous and integral with the remainder of the brick or object which has the desired degree of porosity. The porous and non-porous sections, since they are integrally formed, will not separate during use. In a similar way, one may, if desired, produce an integral brick or object with a solid non-porous center and a porous surface, or with alternate layers of solid and porous material, which are firmly and integrally united in a single piece.

It will be observed that by variations in the quantity of distribution of the vaporizable material, which is mixed with the basic material, the porosity, and through it the thermal conductivity, may be varied at will, within wide limits. The mechanical strength of a brick of a given chemical composition depends to a great extent upon its porosity, and if too porous, its strength may not be sufficient to carry the mechanical load placed thereon during service. In some instances, during industrial operations, the furnace temperatures are higher than the melting points of the furnace refractories, and unless there could be a loss of some of the heat received by the refractory materials, by conduction through the mass of brick to the outside, the brick would be destroyed. If a brick is too porous, it will not allow of the transmission of sufficient heat to keep it from melting, while if not sufficiently porous, it will transmit so much heat to the outside that the loss thereof will be serious and greatly lower the efficiency of the furnace, requiring a greater consumption of fuel or heating energy. With this improved process all of these factors may be taken into account, and the porosity adjusted so as to obtain the most satisfactory results under any given conditions.

Porous bricks or other shapes made in accordance with the process as outlined, have the same refractory qualities as the material used for the residual mass, and their strength is proportional to the percentage of solid material in the finished article. They can be heated and cooled repeatedly without cracking or shrinking, and without loss of strength, can carry a mechanical load while hot, and, if made of suitable basic material, can safely be exposed to extremely high temperatures without deteriorating. In all of these respects, they are a great advance over any heat insulating material now known.

It will be understood that the details of the materials and operations which have been hereinbefore described are given solely for the purpose of explaining the nature and principle of the invention, are therefore to be considered solely as illustrative and not limiting, and that various changes in these details may be made by those skilled in the art within the principle and scope of the invention as expressed in the appended claims.

Claims:

1. In the method of producing a hard porous object of low thermal conductivity from ceramic materials the steps which include mixing with the ceramic material a completely sublimable substance, mixing with the ceramic material and the sublimable substance a liquid chemically inert with respect to the sublimable substance to render the mix plastic, heating the mixture under reduced pressure to vaporize the sublimable substance without melting it, and firing and heating the mixture to completely harden it.

2. In the method of producing a hard porous object of low thermal conductivity from ceramic materials the steps which include mixing with the ceramic material a completely sublimable substance, mixing with the ceramic material and the sublimable substance a liquid chemically inert with respect to the sublimable substance to render the mix plastic, drying the mixture at substantially room temperature, heating the mixture under reduced pressure to vaporize the sublimable substance, and firing and heating the mixture to completely harden it.

3. The method of producing a hard porous object of low thermal conductivity from ceramic materials which includes finely dividing the ceramic material, mixing with the finely divided ceramic material a finely divided completely sublimable substance in the solid state, mixing with the sublimable substance and the ceramic material a liquid chemically inert with respect to the sublimable substance to render the mix plastic, molding the plastic mixture in objects of the desired shape and size, drying the objects at substantially room temperature, heating the objects under reduced pressure to vaporize the sublimable substance without melting it, and firing and heating the objects to completely harden them.

4. The method of producing a hard porous object of low thermal conductivity from ceramic materials which includes finely dividing the ceramic material, mixing with the finely divided ceramic material naphthalene in a finely divided and solid state, mixing water with the naphthalene and the ceramic material to render the mix plastic, molding the plastic mixture into objects of the desired shape and size, drying the objects at substantially room temperature, heating the objects under reduced pressure to volatilize the naphthalene without melting it, and firing and heating the objects to completely harden them.

5. The method of producing a hard porous object of low thermal conductivity from ceramic materials which includes finely dividing the ceramic material, mixing with the finely divided ceramic material anthracene in a finely divided and solid state, mixing water with the anthracene and the ceramic material to render the mix plastic, molding the plastic mixture into objects of the desired shape and size, drying the objects at substantially room temperature, heating the objects under reduced pressure to volatilize the anthracene without melting it, and firing and heating the objects to completely harden them.

6. In a method of producing a hard porous ceramic object having portions of different porosity from ceramic materials, the steps which comprise mixing separate portions of the selected ceramic materials prior to molding with different amounts of a comminuted hydrocarbon solid, which may be made entirely volatile by heat, making the mixture plastic by the addition of a suitable liquid, such as water, molding the plastic mixture into objects of the desired shape and size with the various separate parts occupying any desired position in the molded object, heating the objects to dry them and to vaporize and drive off the hydrocarbon, but insufficiently to completely harden the object, and then firing the objects to completely harden them.

EDWARD MANDEL,
*Administrator of Ambrose J. Mandel, Deceased.*